US011452008B2

(12) United States Patent
Yuh-Ren et al.

(10) Patent No.: US 11,452,008 B2
(45) Date of Patent: Sep. 20, 2022

(54) WIRELESS ROAMING METHOD, ACCESS POINT DEVICE, AND MOBILE STATION

(71) Applicant: SPREADTRUM COMMUNICATIONS (SHANGHAI) CO., LTD., Shanghai (CN)

(72) Inventors: Jauh Yuh-Ren, Shanghai (CN); Yanchao Xu, Shanghai (CN); Qinghua Yu, Shanghai (CN); Long Wang, Shanghai (CN)

(73) Assignee: Spreadtrum Communications (Shanghai) Co., Ltd., Shanghai (CN)

( * ) Notice: Subject to any disclaimer, the term of this patent is extended or adjusted under 35 U.S.C. 154(b) by 677 days.

(21) Appl. No.: 16/320,943

(22) PCT Filed: Jan. 22, 2019

(86) PCT No.: PCT/CN2019/072667
§ 371 (c)(1),
(2) Date: Jan. 25, 2019

(87) PCT Pub. No.: WO2020/147139
PCT Pub. Date: Jul. 23, 2020

(65) Prior Publication Data
US 2021/0337435 A1 Oct. 28, 2021

(30) Foreign Application Priority Data
Jan. 16, 2019 (CN) .......................... 201910039371.3

(51) Int. Cl.
*H04W 4/00* (2018.01)
*H04W 36/00* (2009.01)
(Continued)

(52) U.S. Cl.
CPC ......... *H04W 36/0038* (2013.01); *H04W 8/26* (2013.01); *H04W 12/0471* (2021.01); *H04W 36/08* (2013.01); *H04W 36/30* (2013.01)

(58) Field of Classification Search
CPC ......... H04W 36/0038; H04W 12/0471; H04W 8/26; H04W 36/08; H04W 36/30;
(Continued)

(56) References Cited

U.S. PATENT DOCUMENTS 5,737,689 A * 4/1998 Israelsson ............. H04W 36/30
455/436
8,050,230 B2 * 11/2011 Jechoux ................ H04W 36/30
455/442
(Continued)

FOREIGN PATENT DOCUMENTS

CN 101616408 A 12/2009
CN 103686890 A 3/2014
(Continued)

*Primary Examiner* — Stephen M D Agosta
(74) *Attorney, Agent, or Firm* — Blank Rome LLP (57) ABSTRACT

A wireless roaming method, an access point apparatus and a mobile station are disclosed. The wireless roaming method comprises: determining whether or not a key for a target access point corresponding to a mobile station is stored; if the key is not stored, performing key exchange on behalf of the mobile station with the target access point so as to obtain a key corresponding to the mobile station; and sending the key to the mobile station. In the technical solution of the present disclosure, before the mobile station connects to a target access point, a current access point, on behalf of the mobile station, obtains a key corresponding to the mobile from the target access point. Therefore, the mobile station does not need to perform key exchange with the target access point after accessing to the target access point, which
(Continued)

may reduce roaming delays caused by key exchange and improve the efficiency of wireless roaming, and thereby improve user experience.

14 Claims, 5 Drawing Sheets

(51) Int. Cl.
*H04W 12/0471* (2021.01)
*H04W 8/26* (2009.01)
*H04W 36/08* (2009.01)
*H04W 36/30* (2009.01)

(58) Field of Classification Search
CPC . H04L 2209/80; H04L 63/0853; H04L 9/088; H04L 9/0891; H04L 9/14; G06F 1/32; G06F 1/3228; G06F 1/3278; G06F 1/3284; G06F 1/3287; H04B 7/2606; H04M 1/72412; H04M 2250/02; H04M 2250/06

See application file for complete search history.

(56) References Cited

U.S. PATENT DOCUMENTS

| | | | | |
|---|---|---|---|---|
| 2001/0055395 A1* | 12/2001 | Vogler | ............ | H04L 9/0891 380/273 |
| 2002/0082012 A1* | 6/2002 | Wang | ............ | H04W 36/32 455/436 |
| 2002/0154781 A1* | 10/2002 | Sowa | ............ | H04L 63/062 380/278 |
| 2004/0005057 A1* | 1/2004 | Jang | ............ | H04L 63/104 726/4 |
| 2005/0201564 A1* | 9/2005 | Kayashima | ............ | H04L 9/0891 380/283 |
| 2005/0286466 A1* | 12/2005 | Tagg | ............ | H04W 36/0022 370/329 |
| 2006/0133614 A1* | 6/2006 | Zhang | ............ | H04L 63/068 380/273 |
| 2007/0060127 A1* | 3/2007 | Forsberg | ............ | H04L 63/061 455/436 |
| 2007/0171859 A1* | 7/2007 | Brahmbhatt | ............ | H04W 12/50 370/328 |
| 2007/0255834 A1* | 11/2007 | Abhishek | ............ | H04W 36/0055 709/226 |
| 2008/0080713 A1* | 4/2008 | Cho | ............ | H04W 12/041 380/273 |
| 2008/0267407 A1* | 10/2008 | Vanderveen | ............ | H04W 12/0431 380/277 |
| 2008/0318546 A1* | 12/2008 | Kitazoe | ............ | H04L 63/068 455/410 |
| 2010/0003985 A1* | 1/2010 | Jang | ............ | H04W 36/08 455/436 |
| 2011/0044455 A1* | 2/2011 | Huang | ............ | H04W 12/041 380/278 |
| 2011/0116629 A1* | 5/2011 | Forsberg | ............ | H04L 9/0866 380/44 |
| 2011/0207485 A1* | 8/2011 | Dimou | ............ | H04W 36/0079 455/507 |
| 2011/0261787 A1* | 10/2011 | Bachmann | ............ | H04W 12/037 370/331 |
| 2011/0289562 A1* | 11/2011 | Pang | ............ | H04W 12/041 726/4 |
| 2012/0005731 A1* | 1/2012 | Lei | ............ | H04L 63/083 726/6 |
| 2012/0082314 A1* | 4/2012 | Fukuda | ............ | H04W 12/033 380/270 |
| 2012/0082315 A1* | 4/2012 | Bai | ............ | H04W 36/0038 380/272 |
| 2013/0064225 A1* | 3/2013 | Kitazoe | ............ | H04L 63/108 370/331 |
| 2013/0272269 A1* | 10/2013 | Srivastava | ............ | H04W 36/32 370/332 |
| 2014/0146787 A1* | 5/2014 | Cherian | ............ | H04W 36/0016 370/331 |
| 2014/0362713 A1* | 12/2014 | Agarwal | ............ | H04W 36/0094 370/252 |
| 2017/0134940 A1* | 5/2017 | Sharma | ............ | H04W 12/06 |
| 2017/0142104 A1* | 5/2017 | Masuda | ............ | G06F 21/44 |
| 2017/0238164 A1* | 8/2017 | Pang | ............ | H04W 12/06 455/41.3 |
| 2017/0339626 A1* | 11/2017 | Mustajarvi | ............ | H04W 48/08 |
| 2018/0184345 A1* | 6/2018 | Likar | ............ | H04W 12/0431 |
| 2018/0302834 A1* | 10/2018 | Zhang | ............ | H04W 36/08 |
| 2019/0014509 A1* | 1/2019 | Nakarmi | ............ | H04W 76/19 |
| 2019/0082367 A1* | 3/2019 | Lin | ............ | H04W 36/0038 |
| 2021/0218744 A1* | 7/2021 | Gandhi | ............ | H04L 63/062 |

FOREIGN PATENT DOCUMENTS

| | | |
|---|---|---|
| CN | 106254304 A | 12/2016 |
| CN | 107690138 A | 2/2018 |
| EP | 3104548 A | 12/2016 |

\* cited by examiner

FIG. 7

WIRELESS ROAMING METHOD, ACCESS POINT DEVICE, AND MOBILE STATION

RELATED APPLICATIONS

This application is a U.S. National Stage Application of International Application No. PCT/CN2019/072667, filed on Jan. 22, 2019, which claims priority of Chinese Application No. 201910039371.3, filed on Jan. 16, 2019. The entire contents of those applications are incorporated herein by reference.

TECHNICAL FIELD

The present disclosure relates to the technical field of communications and particularly relates to a wireless roaming method, an access point apparatus and a mobile station.

BACKGROUND

In the Wireless Fidelity (WiFi) technology, a mobile station (STA) gets access to network services by connecting to a wireless access point (AP). However, the range covered by one access point is limited. Because of the mobility of wireless Internet access, the mobile station may move out of the coverage of the currently connected access point. By setting up a new access point, the station can maintain the original Internet access service by connecting to the new access point.

In a Wi-Fi roaming scenario, after switching from a current access point to a target access point, the mobile station needs to engage in key exchange with the target access point so as to obtain a key corresponding to the target access point. However, the process of key exchange can take a certain amount of time, resulting in a considerable roaming delay.

Therefore, a new wireless roaming method is needed to improve the efficiency of wireless roaming.

SUMMARY

In order to make wireless roaming more efficient, according to an embodiment of the present disclosure, there is provided a wireless roaming method comprising: determining whether or not a key for a target access point corresponding to a mobile station is stored; if not, performing, representing the mobile station, key exchange with the target access point, so as to obtain a key corresponding to the mobile station; and sending the key to the mobile station.

Optionally, determining whether or not a key for a target access point corresponding to a mobile station is stored includes: determining whether or not a mobile station is in a boundary state; and if the mobile station is in the boundary state, determining whether or not a key for a target access point corresponding to the mobile station is stored.

Optionally, the boundary state includes: that a difference between a first signal strength information value and a second signal strength information value of the mobile station is less than a boundary threshold value, wherein the first signal strength information value includes the signal strength of the current access point detected by the mobile station or the signal strength of the mobile station detected by the current access point; the second signal strength information value includes the signal strength of the target access point detected by the mobile station or the signal strength of the mobile station detected by the target access point.

Optionally, the boundary threshold value is a fixed value.

Optionally, the boundary threshold value is related to a larger one of the first signal strength information value and the second signal strength information value, or related to the average value of the first signal strength information value and the second signal strength information value.

Optionally, the key exchange includes: sending to the target access point key request information including a MAC address of a mobile station represented, obtaining key request feedback information from the target access point, calculating according to the key request feedback information and obtaining the key, and confirming the key with the target access point.

According to an embodiment of the present disclosure, there is provided a wireless roaming method comprising: receiving a key update request sent by a current access point; performing key exchange with the current access point; performing key confirmation with the current access point; determining whether or not a mobile station accesses; and if it is determined that a mobile station accesses, using the key to communicate with the mobile station.

Optionally, performing key exchange with the current access point includes: receiving key request information sent by the current access point, the key request information including a MAC address of a mobile station represented by the current access point; sending the key request information to an access point controller; receiving a Base Transient Key (BTK) and a Refresh Number (RN) sent by the access point controller; and generating a Pairwise Transient Key (PTK) by the BTK and the RN, and sending key feedback information to the current access point, the key feedback information including the BTK and the RN.

Optionally, subsequent to the access of the mobile station, the wireless roaming method further comprises: sending a broadcast key to the mobile station.

According to an embodiment of the present disclosure, there is provided a wireless roaming method comprising: receiving a key corresponding to a target access point from a current access point; determining whether or not roaming is to be performed; and if roaming is to be performed, communicating with the target access point using the key that is received, wherein the current access point has the same Service Set Identifier as the target access point.

Optionally, if a key sent by a current access point is not received when roaming is performed, key exchange is performed with the target access point so as to obtain a key.

Optionally, after roaming is performed, the wireless roaming method further comprises receiving a broadcast key sent by the target access point.

According to an embodiment of the present disclosure, there is provided an access point apparatus including a memory and a processor, wherein the memory stores a computer program runnable on the processor, and the processor carries out the steps of the wireless roaming method when executing the program.

According to an embodiment of the present disclosure, there is provided an access point apparatus including a memory and a processor, wherein the memory stores a computer program runnable on the processor, and the processor carries out the steps of the wireless roaming method when executing the program.

According to an embodiment of the present disclosure, there is provided a mobile station including a memory and a processor, wherein the memory stores a computer program runnable on the processor, and the processor carries out the steps of the wireless roaming method when executing the program.

As compared with the prior art, the embodiments of the present disclosure are advantageous in the following:

In the embodiments of the present disclosure, it is determined whether or not a mobile station is in a boundary state; if the mobile station is in the boundary state, it is determined whether or not a key for a target access point corresponding to the mobile station is stored; if the key is not stored, key exchanged is performed with the target access point on behalf of the mobile station so as to obtain a key corresponding to the mobile station; and the key is sent to the mobile station. In the technical solution of the present disclosure, before the mobile station connects to a target access point, a current access point, on behalf of the mobile station, obtains a key corresponding to the mobile station from the target access point. Therefore, the mobile station does not need to perform key exchange with the target access point after accessing to the target access point, which reduces roaming delays caused by key exchange and improves the efficiency of wireless roaming, and thereby improves user experience.

Further, the boundary threshold value is related to a larger one of the first signal strength information value and the second signal strength information value, or related to the average value of the first signal strength information value and the second signal strength information value. In the technical solution of the present disclosure, by setting the boundary threshold value to be associated to signal strength information, it can be avoided that the current access point frequently determine whether or not it stores a key for the target access point corresponding to the mobile station due to a rather small boundary threshold value set when two wireless access points are relatively close to one another, thereby cutting down the power consumption of the current access point.

DETAILED DESCRIPTION

Figure 1:
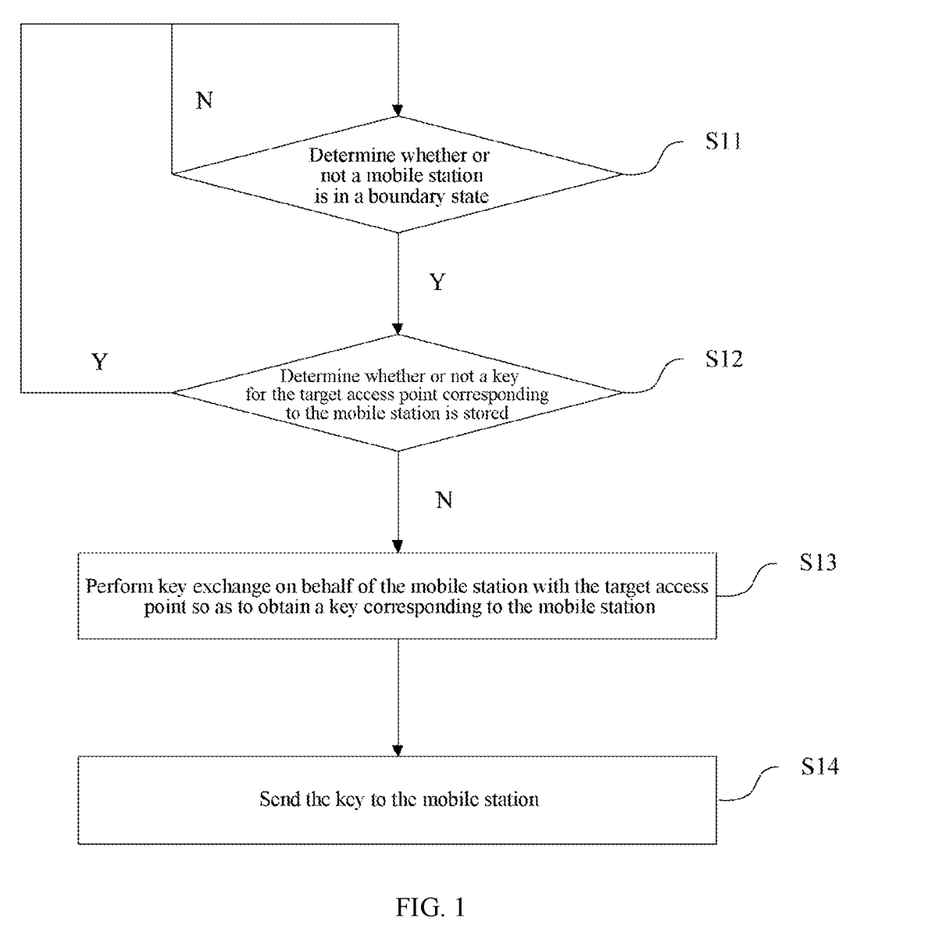
FIG. 1 is a flowchart of a wireless roaming method according to an embodiment of the present disclosure.

FIG. 1 is a flowchart of a wireless roaming method according to an embodiment of the present disclosure. The roaming method shown in FIG. 1 is applicable to a current access point side and includes steps described below. It should be noted that the sequence numbers of the steps in this embodiment are not meant to limit the order of carrying out the steps.

In a step S11, it is determined whether or not a mobile station is in a boundary state. In some embodiments, when the current access point connects to a mobile station, the current access point determines whether or not the mobile station is in a boundary state. The current access point refers to an access point that is connected to the station, which means that the station accesses the current access point. The current access point has the same Service Set Identifier (SSID) as a target access point. The station can switch between the current access point and the target access point and maintain an uninterrupted network connection, thereby realizing wireless roaming.

In practical applications, the boundary state includes that the difference between a first signal strength information value and a second signal strength information value of the mobile station is less than a boundary threshold value, wherein the first signal strength information value includes the signal strength of the current access point detected by the mobile station or the signal strength of the mobile station detected by the current access point, and the second signal strength information value includes the signal strength of the target access point detected by the mobile station or the signal strength of the mobile station detected by the target access point.

Specifically, the first signal strength information value and the second signal strength information value may both be a Received Signal Strength Indicator (RSSI) value.

In some embodiments, the boundary threshold value may be set to a fixed value, for example, 10 dB. In one embodiment, the boundary threshold value is 10 dB, the first signal strength information value is −80 dBm, and the second signal strength information value is −75 dBm. So, the absolute value of the difference between the two information values is 5 dB, which is less than the boundary threshold value. Thus, it can be determined that the mobile station is in a boundary state.

In some cases, if the current access point is too close to the target access point, the first signal strength information value and the second signal strength information value both are relatively large. Thus, the boundary threshold value that is set to be a fixed value will probably be exceeded even if the mobile station moves in a small range, causing the current access point to frequently determine whether or not a key for the target access point corresponding to the mobile station is stored. Nonetheless, if the boundary threshold value is set too large, it will be relatively difficult for the mobile station to complete the switch.

In some embodiments, the boundary threshold value can be set to be a variable value. Specifically, the boundary threshold value is related to the larger one of the first signal strength information value and the second signal strength information value, or related to the average value of the first signal strength information value and the second signal strength information value.

In one embodiment, the boundary threshold value may be $0.1*[\max(AP1\_RSSI, AP2\_RSSI)-\text{Ref}]$, wherein $AP1\_RSSI$ and $AP2\_RSSI$ are the first signal strength information value and the second signal strength information value respectively, and Ref is a reference fixed value.

With the above setting, if the current access point is excessively close to the target access point, the boundary threshold value will correspondingly increase, thereby effectively reducing the times for the current access point to determine whether a key for the target access point corresponding to the mobile station is stored, thereby reducing the power consumption of the current access point.

In some embodiments, if the mobile station is in a boundary state, a step S12 is executed. Otherwise, the step S11 is continued to be executed.

In S12, it is determined whether or not a key for the target access point corresponding to the mobile station is stored.

In some embodiments, when the mobile station is in a boundary state, the current access point determines whether or not a key for the target access point corresponding to the mobile station is stored. The key includes a unicast key used in the communication between the mobile station and the target access point.

If the current access point stores the key of the target access point, the current access point performs S11. Otherwise, S13 is executed.

In S13, key exchange is performed on behalf of the mobile station to obtain a key corresponding to the mobile station.

In some embodiments, if the current access point does not store a key for the target access point, then it, on behalf of the mobile station, performs key exchange with the target access point. The step of key exchange includes: sending to the target access point key request information, the key request information including a MAC address of the mobile station that is represented; obtaining key request feedback information from the target access point; obtaining a key based on the key request feedback information; and confirming the key with the target access point.

Figure 2:
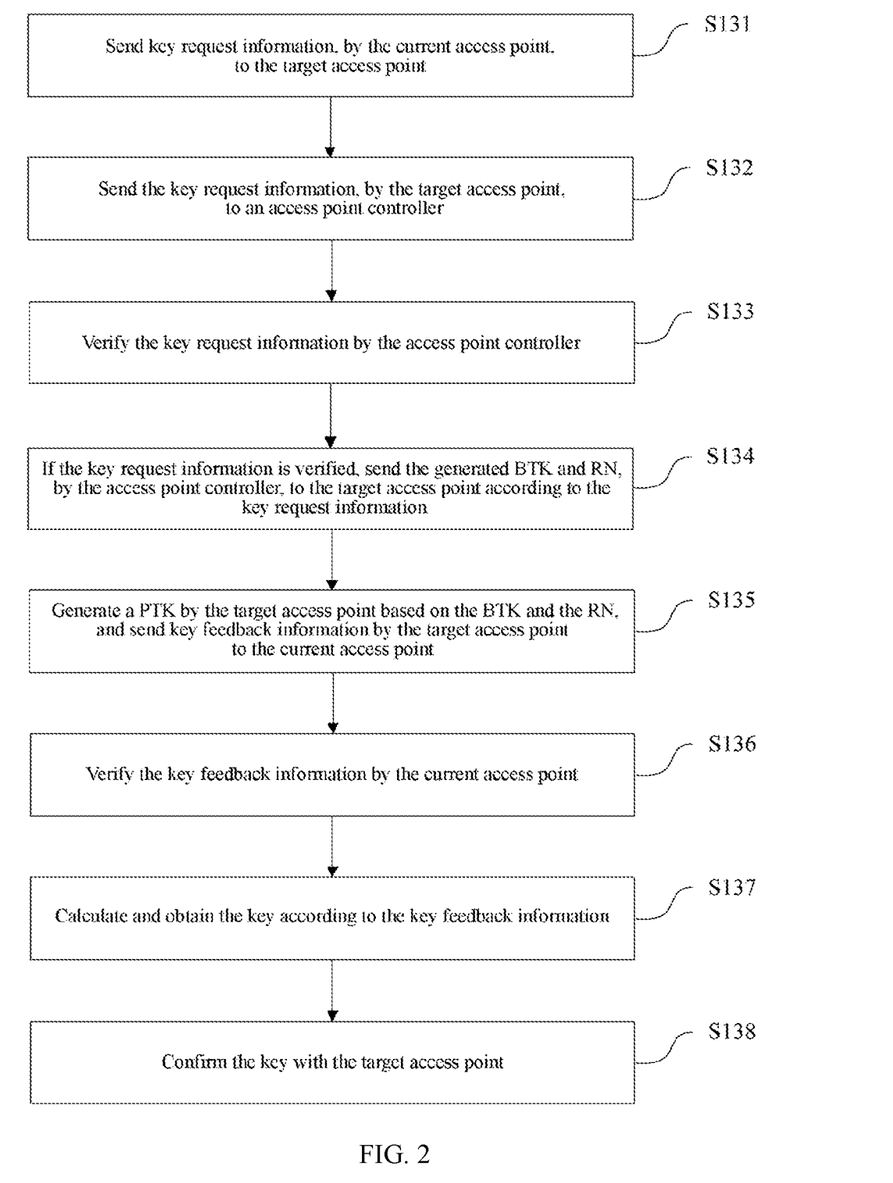
FIG. 2 is a flowchart of S13 in FIG. 1.

The step of key exchange between the current access point and the target access point may refer to FIG. 2, which is a flowchart of S13 in FIG. 1.

In S131, the current access point sends key request information to the target access point.

Specifically, in an embodiment, information in the key request information is encrypted by a Key Request Key (KRK). In another embodiment, the communication between the current access point and the target access point has a specific key, by which the information in the key request information is encrypted.

In S132, the target access point sends the key request information to an access point controller.

In S133, the access point controller verifies the key request information.

In S134, if the key request information is verified, the access point controller sends a generated Base Transient Key (BTK) and Refresh Number (RN) to the target access point according to the key request information.

In S135, the target access point generates a Pairwise Transient Key (PTK) according to the BTK and the RN, and sends key feedback information to the current access point.

In some embodiments, the target access point generates a PTK based on the BTK and the RN, and the PTK is then used as a key in the communication with the corresponding mobile station. The key feedback information includes the BTK and the RN.

In S136, the current access point verifies the key feedback information.

In S137, a key is obtained by calculating according to the key feedback information.

In some embodiments, the current access point calculates a PTK from the BTK and the RN in the key feedback information, which is then used as a key for the communication between the mobile station and the target access point.

In S138, the key is confirmed with the target access point.

In S14, the key is sent to the mobile station.

In some embodiments, the current access point sends the key to the mobile station after the mobile station is in a boundary state. Thus, after accessing to the target access point, the mobile station does not need to perform key exchange with the target access point, which reduces roaming delays caused by key exchange and improves the efficiency of the wireless roaming, thereby improving user experience.

Figure 3:
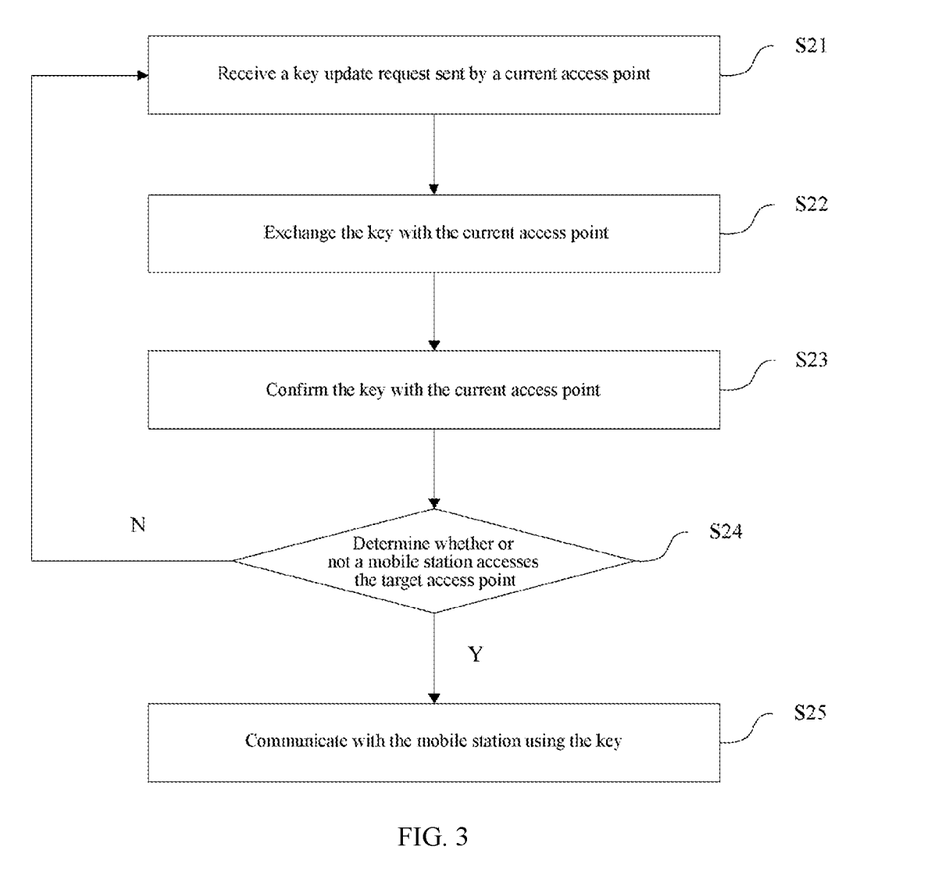
FIG. 3 is a flowchart of a wireless roaming method according to an embodiment of the present disclosure.

FIG. 3 is a flowchart of a wireless roaming method according to an embodiment of the present disclosure. The roaming method shown in FIG. 3 is applicable to the target access point side and includes steps described below. It should be noted that the sequence numbers of the steps in this embodiment are not meant to limit the order of carrying out the steps.

In S21, a key update request sent by a current access point is received.

In some embodiments, when a mobile station is in a boundary state, a target access point will receive a key update request sent by a current access point on behalf of the mobile station, so that the mobile station can obtain a key corresponding to the target access point.

In S22, key exchange is performed with the current access point.

In some embodiments, key exchange between the target access point and the current access point includes: receiving key request information sent by the current access point, the key request information including a MAC address of the mobile station represented by the current access point; sending the key request information to an access point controller; receiving a BTK and a RN sent by the access point controller; and generating a PTK by the target access point based on the BTK and the RN and sending, by the target access point, key feedback information to the current access point, the key feedback information including the BTK and the RN.

For more details of S22, see the related description of S13 given above.

In S23, key confirmation is performed with the current access point.

In S24, it is determined whether or not a mobile station accesses.

In some embodiments, the mobile station can access the target access point when certain conditions are met, for example, when the second signal strength information value is greater than the first signal strength information value.

In some embodiments, if the target access point determines the access of the mobile station, S25 is executed. Otherwise, S21 is executed.

In S25, the key is used for communication with the mobile station.

In some embodiments, the target access point uses a unicast key to communicate with the mobile station.

In some embodiments, after determining the access of the mobile station, the target access point sends a broadcast key to the mobile station in a unicast manner so that the mobile station can receive broadcast information sent by the target access point.

Figure 4:
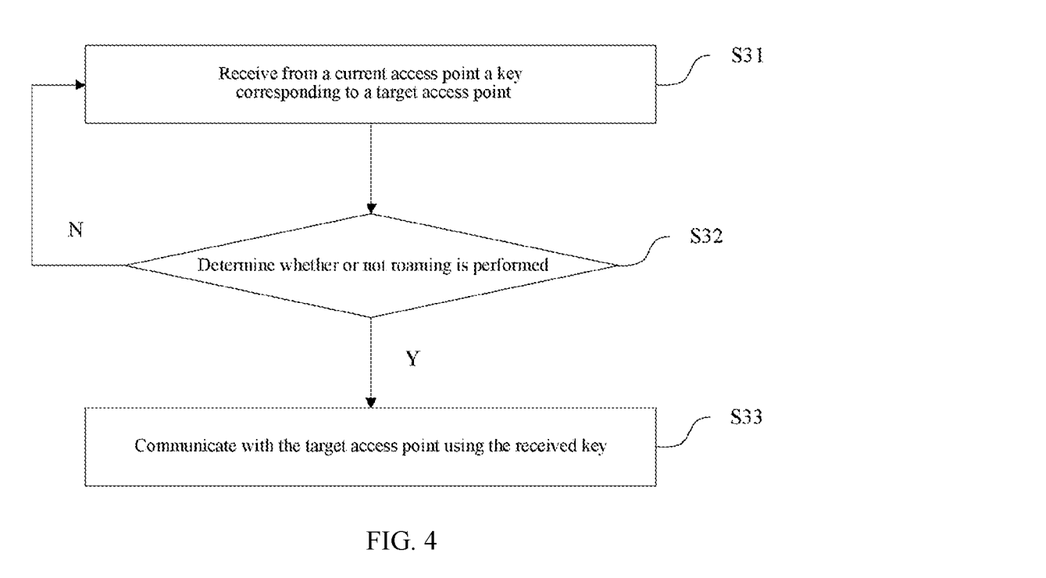
FIG. 4 is a flowchart of a wireless roaming method according to an embodiment of the present disclosure.

FIG. 4 is a flowchart of a wireless roaming method according to an embodiment of the present disclosure. The roaming method shown in FIG. 4 is applicable to the mobile station side and includes steps described below. It should be noted that the sequence numbers of the steps in this embodiment are not meant to limit the order of carrying out the steps.

In S31, a key corresponding to a target access point is received from a current access point.

In some embodiments, when the mobile station is in a boundary state, that is, when the difference between the first signal strength information value and the second signal strength information value of the mobile station is less than a boundary threshold value, the mobile station receives a key corresponding to a target access point from the current access point.

In some embodiments, the boundary state includes that the difference between a first signal strength information value and a second signal strength information value of the mobile station is less than a boundary threshold value. The boundary threshold value may be a fixed value or a variable value. For more details of the boundary state and the boundary threshold value, see the related description about S11 given above.

In S32, it is determined whether or not roaming is to be performed.

When certain conditions are met, for example, when the second signal strength information value is greater than the first information strength information value, the mobile station may roam and switch to the target access point.

In S33, communication is performed with the target access point using the received key.

In some embodiments, the mobile station may communicate with the target access point using the received key. Therefore, after accessing to the target access point, the mobile station does not need to perform key exchange with the target access point, which reduces roaming delays caused by key exchange and improves the efficiency of the wireless roaming, thereby improving user experience.

In some embodiments, if a unicast key sent by the current access point has not been received when the mobile station is roaming, the key exchange is performed with the target access point so as to obtain a unicast key.

In some embodiments, after the mobile station roams and accesses the target access point, a broadcast key sent by the target access point is received.

Figure 5:
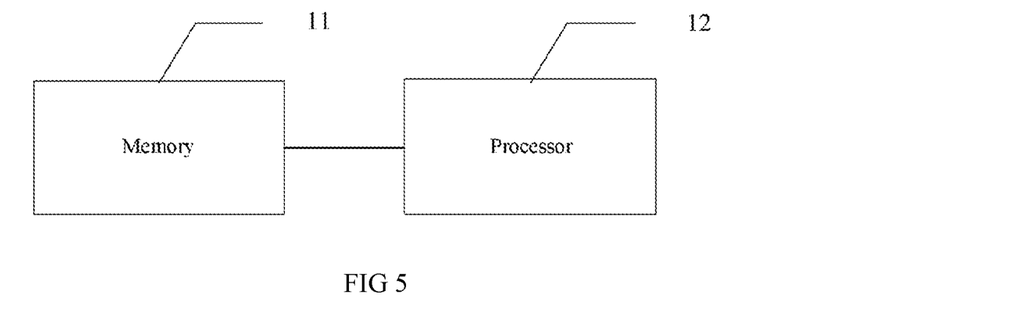
FIG. 5 is a structural diagram of an access point apparatus according to an embodiment of the present disclosure.

FIG. 5 is a structural diagram of an access point apparatus according to an embodiment of the present disclosure. The access point apparatus is used on a current access point side and includes a memory 11 and a processor 12. The memory 11 stores a computer program runnable on the processor 12. The computer program stored in the memory 11 is a program that carries out the steps of the wireless roaming method. The processor 12 carries out the steps when executing the program. The memory 11 may include a ROM, a RAM, a magnetic disk, an optical disk, and the like. The steps of the wireless roaming method are described in the foregoing and are not repeated herein.

Figure 6:
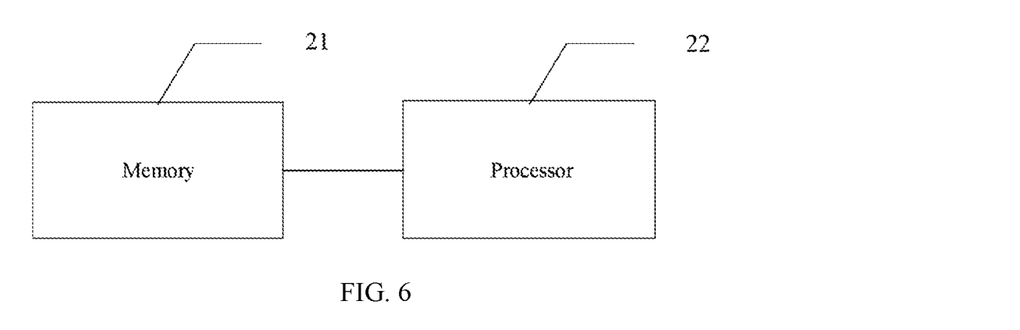
FIG. 6 is a structural diagram of an access point apparatus according to an embodiment of the present disclosure.

FIG. 6 is a structural diagram of an access point apparatus according to an embodiment of the present disclosure. The access point apparatus is used on a target access point side and includes a memory 21 and a processor 22. The memory 21 stores a computer program runnable on the processor 22. The computer program stored in the memory 21 is a program that carries out the steps of the wireless roaming method. The processor 22 carries out the steps when executing the program. The memory 21 may include a ROM, a RAM, a magnetic disk, an optical disk, and the like. The steps of the wireless roaming method are described in the foregoing and are not repeated herein.

Figure 7:
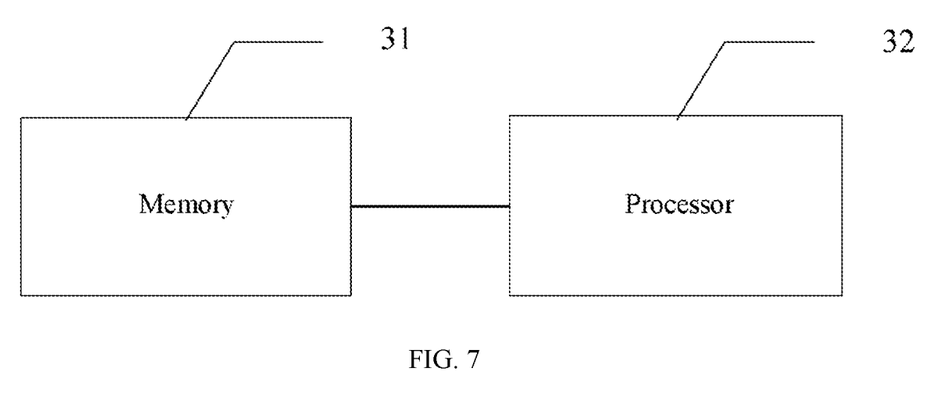
FIG. 7 is a structural diagram of a mobile station according to an embodiment of the present disclosure.

FIG. 7 is a structural diagram of a mobile station according to an embodiment of the present disclosure. The mobile station includes a memory 31 and a processor 32. The memory 31 stores a computer program runnable on the processor 32. The computer program stored in the memory 31 is a program that carries out the steps of the wireless roaming method. The processor 32 carries out the steps when executing the program. The memory 31 may include a ROM, a RAM, a magnetic disk, an optical disk, and the like. The steps of the wireless roaming method are described in the foregoing and are not repeated herein.

Although the present disclosure has been described as above, the present disclosure is not limited to the description. Any change and modification can be made by those skilled in the art without departing from the spirit and scope of the present disclosure. Therefore, the scope of protection of the present disclosure should be determined by the claims.

What is claimed is:

1. A wireless roaming method comprising:
   determining, by a current access point, whether a mobile station is in a boundary state, wherein the boundary state includes that a difference between a first signal strength information value and a second signal strength information value of the mobile station is less than a boundary threshold value, the first signal strength information value representing a signal strength between the mobile station and the current access point, and the second signal strength information value representing a signal strength between the mobile station and a target access point;
   in response to the mobile station being in the boundary state, determining, by the current access point, whether a key for the target access point corresponding to the mobile station is stored;
   in response to the key not being stored, performing, by the current access point, a key exchange on behalf of the mobile station with the target access point to obtain a key corresponding to the mobile station, wherein the key exchange includes:
      sending, by the current access point, key request information to the target access point, the key request information including a MAC address of the mobile station that is represented,
      obtaining, by the current access point, key request feedback information from the target access point,
      calculating, by the current access point, based on the key request feedback information and obtaining a key, and
      confirming, by the current access point, the key with the target access point; and
   sending, by the current access point, the key to the mobile station.

2. The wireless roaming method according to claim 1, wherein the boundary threshold value is a fixed value.

3. The wireless roaming method according to claim 1, wherein the boundary threshold value is related to a larger one of the first signal strength information value and the second signal strength information value, or related to an average value of the first signal strength information value and the second signal strength information value.

4. The wireless roaming method according to claim 1, further comprising:
   receiving, by the target access point, a key update request sent by the current access point;
   performing, by the target access point, a key exchange with the current access point;
   performing, by the target access point, key confirmation with the current access point;
   determining, by the target access point, an access of the mobile station; and
   based on the determined access of the mobile station, communicating, by the target access point, with the mobile station using the key.

5. The wireless roaming method according to claim 4, wherein performing key exchange with the current access point includes:
   receiving, by the target access point, key request information sent by the current access point, the key request information including a MAC address of a mobile station represented by the current access point;
   sending, by the target access point, the key request information to an access point controller;

receiving, by the target access point, a Base Transient Key (BTK) and a Refresh Number (RN) sent by the access point controller; and generating, by the target access point, a Pairwise Transient Key (PTK) based on the BTK and the RN and sending key feedback information to the current access point, the key feedback information including the BTK and the RN.

6. The wireless roaming method according to claim 4, wherein subsequent to the access of the mobile station, the wireless roaming method further comprises:

sending a broadcast key to the mobile station.

7. The wireless roaming method according to claim 1, further comprising:

receiving, by the mobile station and from the current access point, a key corresponding to a target access point;

determining, by the mobile station, whether roaming is to be performed; and in response to a determination that roaming is to be performed, communicating, by the mobile station, with the target access point using the received key, wherein the current access point has the same Service Set Identifier as the target access point.

8. The wireless roaming method according to claim 7, wherein in response to a key sent by the current access point not being received when roaming is performed, performing, by the mobile station, key exchange with the target access point so as to obtain a key.

9. The wireless roaming method according to claim 7, wherein after roaming is proceeded, the roaming method further comprises:

receiving, by the mobile station, a broadcast key sent by the target access point.

10. The wireless roaming method according to claim 1, wherein:

the first signal strength information value includes the signal strength of the current access point detected by the mobile station or the signal strength of the mobile station detected by the current access point, and the second signal strength information value includes the signal strength of the target access point detected by the mobile station or the signal strength of the mobile station detected by the target access point.

11. An access point apparatus, comprising:

a first access point apparatus functioning as a current access point, the first access point comprising:

a non-transitory memory which stores a computer program executable on a processor; and the processor, wherein the processor carries out operations comprising:

determining whether a mobile station is in a boundary state, wherein the boundary state includes that a difference between a first signal strength information value and a second signal strength information value of the mobile station is less than a boundary threshold value, the first signal strength information value representing a signal strength between the mobile station and the current access point, and the second signal strength information value representing a signal strength between the mobile station and a target access point;

in response to the mobile station being in the boundary state, determining whether a key for the target access point corresponding to the mobile station is stored;

in response to the key being not stored, performing a key exchange on behalf of the mobile station with the target access point to obtain a key corresponding to the mobile station, wherein the key exchange includes:

sending, by the current access point, key request information to the target access point, the key request information including a MAC address of the mobile station that is represented, obtaining, by the current access point, key request feedback information from the target access point, calculating, by the current access point, based on the key request feedback information and obtaining a key, and confirming, by the current access point, the key with the target access point; and sending the key to the mobile station.

12. The access point apparatus according to claim 11, wherein:

the first signal strength information value includes the signal strength of the current access point detected by the mobile station or the signal strength of the mobile station detected by the current access point, and the second signal strength information value includes the signal strength of the target access point detected by the mobile station or the signal strength of the mobile station detected by the target access point.

13. A system, comprising:

a first access point apparatus functioning as a current access point, the first access point apparatus comprising:

a first non-transitory memory which stores a computer program executable on a first processor; and the first processor, wherein the first processor carries out operations comprising:

determining whether a mobile station is in a boundary state, wherein the boundary state includes that a difference between a first signal strength information value and a second signal strength information value of the mobile station is less than a boundary threshold value, the first signal strength information value representing a signal strength between the mobile station and the current access point, and the second signal strength information value representing a signal strength between the mobile station and a target access point; and in response to the mobile station being in the boundary state, determining whether a key for the target access point corresponding to the mobile station is stored;

in response to the key being not stored, performing a key exchange on behalf of the mobile station with the target access point to obtain a key corresponding to the mobile station; and sending the key to the mobile station; and a second access point apparatus functioning as the target access point, the second access point apparatus comprising:

a second non-transitory memory which stores a computer program executable on a second processor; and the second processor, wherein the second processor carries out operations comprising:

receiving a key update request sent by the current access point;

performing a key exchange with the current access point;

performing key confirmation with the current access point;

determining an access of the mobile station; and based on the determined access of the mobile station, communicating with the mobile station using the key.

14. The system according to claim 13, wherein:

the first signal strength information value includes the signal strength of the current access point detected by the mobile station or the signal strength of the mobile station detected by the current access point, and the second signal strength information value includes the signal strength of the target access point detected by the mobile station or the signal strength of the mobile station detected by the target access point.

* * * * *